United States Patent [19]

Kurushima

[11] Patent Number: 4,853,276

[45] Date of Patent: Aug. 1, 1989

[54] MARBLE-TRANSLUCENT THIN RESILIENT DECORATIVE SHEET

[75] Inventor: Toyokazu Kurushima, Chita, Japan

[73] Assignee: Inax Corporation, Japan

[21] Appl. No.: 74,283

[22] Filed: Jul. 16, 1987

[30] Foreign Application Priority Data

Jul. 22, 1986 [JP] Japan ................................ 61-172510

[51] Int. Cl.[4] ........................... B32B 3/00; B32B 5/16; B32B 7/14

[52] U.S. Cl. ..................................... 428/187; 428/195; 428/172; 428/203; 428/204; 428/207; 428/208; 428/215; 428/323; 428/414; 428/481; 428/482; 428/514; 428/329; 428/542.6; 428/904.4

[58] Field of Search ............ 428/195, 323, 329, 542.6, 428/514, 904.4, 914, 187, 215, 172, 203, 204, 207, 208

[56] References Cited

U.S. PATENT DOCUMENTS 4,409,280 10/1983 Wiley et al. ....................... 428/904.4

4,591,525 5/1986 Cass .................................. 428/904.4

FOREIGN PATENT DOCUMENTS 1300 of 1882 United Kingdom .

OTHER PUBLICATIONS

Abstract, 90863a/50, Nakajima, J78043-208, Nov. 1978.

*Primary Examiner*—P. C. Ives

*Attorney, Agent, or Firm*—Lerner, David, Littenberg, Krumholz & Mentlik

[57] ABSTRACT

There is provided a novel marble-translucent thin resilient decorative sheet 1, which comprises thin permeable pulp paper 2, fine whitish inorganic filler powder, and a substantially transparent cured resin contained by impregnation throughout the pulp paper, said filler powder being uniformly deposited onto at least the top surface of the pulp paper and being firmly fixed thereto. The decorative sheet is produced by impregnating fine whitish inorganic filler-loaded permeable pulp paper with a liquid polymerizable resinous composition for forming a substantially transparent cured resin, placing the impregnated pulp paper between molding plates, and polymerizing the resinous composition into a cured resin; or by impregnating permeable non-loaded pulp paper containing no filler powder with the liquid resinous composition containing fine whitish inorganic filler powder and carrying out the polymerization between molding plates as described above.

14 Claims, 1 Drawing Sheet

MARBLE-TRANSLUCENT THIN RESILIENT DECORATIVE SHEET

BACKGROUND OF THE INVENTION

1. Field of the Invention

This invention relates to a marble-translucent thin resilient decorative sheet and a method for production thereof. More specifically, this invention relates to a marble-translucent thin resilient decorative sheet which has excellent properties such as flame retardance, long-term stability and good workability and also exhibits beautiful high-quality textures, as well as a method for production thereof.

2. Description of the Prior Art

Hitherto, plastic sheets (e.g. vinylchloride resin sheeting), resin-coated paper, resin-laminated paper, artificial marble-tone resin boards, etc. have been used as decorative covering materials for floors, walls, ceilings, toilet tables, bath rooms, and the like. These plastic sheets and coated or laminated paper fail to exhibit marble-translucent tones. The conventional marble-tone boards are thick, heavy, fragile and expensive without resilient semi-flexible properties, because the thickness of 1 cm or more is needed to provide the marble tone and practical strength.

The main object of the present invention is to provide a marble-translucent thin resilient decorative sheet to be applied with low costs to the above mentioned uses. The other objects and features of the present invention will become apparent from the following description.

SUMMARY OF THE INVENTION

According to the present invention, there is provided a marble-translucent thin resilient decorative sheet 1, which comprises thin permeable pulp paper 2, fine whitish inorganic filler powder, and a substantially transparent cured resin contained by impregnation throughout the pulp paper, said filler powder being uniformly deposited onto at least the top surface of the pulp paper and being firmly fixed thereto, whereby the decorative sheet is provided with a deep marble-translucent tone by the synergistic effect of both the filler powder filled with the cured resin (substantially forming a marble tone) and the pulp paper filled with the cured resin (substantially forming a deep translucent tone).

The novel marble-translucent thin resilient decorative sheet can be produced by the method of the present invention, which comprises impregnating fine whitish inorganic filler-loaded permeable pulp paper (i.e. containing the filler powder throughout the pulp paper) with a liquid polymerizable resinous composition for forming a substantially transparent cured resin, placing the impregnated pulp paper between molding plates, and polymerizing the resinous composition into a substantially transparent cured resin. The liquid resinous composition may further contain fine whitish inorganic filler powder. Alternatively, substantially the same decorative sheet can be produced by impregnating permeable non-loaded pulp paper (i.e. containing no filler powder) with the liquid resinous composition containing fine whitish inorganic filler powder and carrying out the polymerization between molding plates as described above, whereby the filler powder is deposited onto or further into the top surface of the pulp paper and firmly fixed thereto.

DETAILED DESCRIPTION OF THE INVENTION

Figure 1:
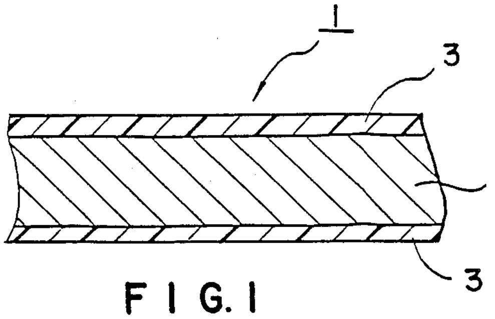
FIG. 1 is a schematic cross-sectional partial view of an embodiment of the marble-translucent thin resilient decorative sheet 1 according to the present invention.

The term "marble-translucent" herein means a deep translucent tone like a thick natural marble stone plate. The term "resilient sheet" means elastic semi-flexible sheets which can be wound around a cylinder having a diameter less than about 50 cm, normally 40 cm, preferably 30 cm and typically 20 cm without cracks. Incidentally, when the cured resin of the present thin decorative sheet is a thermoplastic resin, the decorative sheet can become more flexible by warming it upon installation to a temperature lower than its self-deforming temperature.

Thin decorative sheet

The passage "said filler powder being uniformly deposited onto at least the top surface of the pulp paper" appearing in the paragraph of Summary of the Invention means that the inorganic filler is either (a) distributed and deposited substantially uniformly throughout the pulp paper layer, or (b) distributed and deposited on one surface or both surfaces of the pulp paper layer. It is generally preferred that the filler is distributed uniformly throughout the pulp paper layer by the use of the inorganic filler-loaded pulp paper.

The decorative sheet can comprise two or more sheets of permeable pulp paper each impregnated with the substantially transparent cured resin to provide a laminated structure, as shown in the following Example 2.

The decorative sheet can have thin resin surface layer(s) 3 on one or both surfaces of the pulp paper layer. Such a resin surface layer 3 comprises the same resin as contained in the pulp paper layer and, as necessary, the same inorganic filler as is deposited at least on the surface of the pulp paper. The thickness of the resin surface layer is generally in the range of about 0.01 to 0.1 mm. Such surface layers are preferred for preventing cracks upon bending and for providing luster, but are not preferred and should be removed by means of abrasion or the like in the case where flame retardance of the decorative sheet is to be enhanced. For decorating the sheet, the resin surface layer may have an embossed or frosted pattern.

The thickness of the decorative sheet is generally about 0.1 to about 5 mm, and typically about 0.2 mm to about 2 mm. More specifically, in view of providing the pulp paper layer with marble-translucent tones and resilient properties, the thickness of the decorative sheet varies depending upon the types of the pulp paper and the liquid resinous composition used. For example, the following table shows the typical thickness of the decorative sheets according to the preferred embodiments of the invention, but the present invention is not restricted to such typical embodiments.

| | Thickness of Decorative Sheet | |
| --- | --- | --- |
| | liquid resinous composition | |
| pulp paper | methyl methacrylate resin (without a filler) | methyl methacrylate resin + aluminum hydroxide |
| | (*) | (**) |
| filler-loaded pulp paper containing aluminum hydroxide | about 0.3 to about 1.5 mm | about 0.2 to about 1 mm |
| permeable pulp paper containing no filler powder | | (***) about 0.5 to about 1 mm |

Notes:
(*)(***): The ratio of the resin to the filler powder is 1:1 by weight.
(**): The ratio of the resin to the filler is 2:3 by weight.

Incidentally, the lower value of thickness in the table is limited for providing the sheet with a satisfactorily marble-translucent tone. The higher value of thickness in the table is restricted to obtain such satisfactorily resilient properties as the decorative sheet can be wound around a cylinder of 15 cm in diameter without cracks at room temperature, although the thickness varies depending upon the amount of the cured resin contained in the sheet.

In the present thin resilient decorative sheet, the preferable ratios by weight of the pulp, resin and filler powder are generally in the following ranges: ratio of cured resin to pulp=1 to 0.5~2; pulp to filler=1 to 1~10; and liquid resin composition to filler=1 to 0~2, approximately.

Pulp paper

The permeable pulp paper used in the invention includes non-loaded pulp paper such as filter paper and filler powder-loaded pulp paper containing a fine whitish inorganic filler, and is preferably such filler-loaded pulp paper. The amount of the filler contained in the paper is not especially restricted as long as the liquid-permeable property is provided, and is generally in the range of from 0 to about 95% by weight, preferably 5 to about 90% by weight, more preferably about 20 to about 85% by weight of the total weight of the pulp paper.

The thickness of the pulp paper is generally about 0.1 to about 5 mm, and typically about 0.2 mm to about 2 mm.

Transparent cured resin

The substantially transparent cured resin contained by impregnation in the pulp paper layer includes, for example, acrylic resins such as homopolymers and copolymers of (meth)acrylic acid, (meth)acrylic esters (e.g. methyl (meth)acrylate), acrylamide and acrylonitrile; saturated polyester resins; crosslinked polyester resins; epoxy resins, and mixtures thereof. In general, acrylic resins and especially acrylic resins comprising methyl methacrylate component are preferably used because of suitably resilient transparent properties.

Inorganic filler powder

The fine whitish inorganic filler contained in the decorative sheet includes, for example, fine powder of minerals such as aluminum hydroxide, aluminum silicate, calcium carbonate, silica stone, magnesium hydroxide, gypsum, layer-structure silicate minerals, and mixtures thereof.

In order to make the thin decorative sheet translucent, the filer powder is selected so that there is a substantial difference between the refractive index of the filler and the index of the cured transparent resin. Such fillers can be readily selected by those skilled in the art with respect to the resin to be used. For example, aluminum hydroxide powder is suitably used in combination with cured acrylic resins.

The average particle size (diameter) of the inorganic filler is generally in the range of about 0.1 to about 50 microns, preferably about 0.5 to about 25 microns, and more preferably about 1 to about 20 microns. Incidentally, the filler powder of less than 25 microns in diameter can penetrate into the permeable pulp paper when the paper is impregnated with the liquid resinous composition containing the filler powder. The filler powder of more than 25 microns in diameter is generally deposited uniformly onto the surface of the pulp paper when impregnated with the liquid composition, although some filler powder penetrates into the pulp paper.

Preparation of thin decorative sheet

Polymerizable liquid resinous composition

The polymerizable liquid resinous composition to be used for impregnation of the pulp paper comprises as a main component a liquid monomer, a liquid prepolymer, or a monomer solution of a prepolymer or polymer which provides a substantially transparent cured resin upon polymerization. The resin components thereof include, for example, acrylic resins such as homopolymers or copolymers of methyl (meth)acrylate, (meth)acrylamide, (meth)acrylonitrile, etc.; saturated polyester resins; crosslinked polyester resins comprising unsaturated polyester prepolymer and vinyl monomer components; and epoxy resins. These polymerizable liquid resinous compositions are known in the art as the liquid composition for cast molding. The viscosity of the liquid composition, however, is adjusted to the viscosity suitable for the impregnation and the curing between the molding plates.

The liquid resinous composition generally contains effective amounts of a crosslinking agent and a polymerization catalyst such as a radical initiator usually used for such polymerization reactions and, as necessary, a coloring agent (pigment or dye).

Impregnation

Impregnation of the pulp paper is carried out generally by soaking the paper in the polymerizable liquid resinous composition for several minutes to about ten minutes, or by applying two or more different resinous compositions onto the surface of the pulp paper in such a fashion as to give a desired pattern of the different compositions, as shown in the following Example 3.

Polymerization

Polymerization conditions vary depending upon the type of the monomer or prepolymer employed. The polymerization temperature is generally between room temperature and a temperature lower than the boiling temperature of the liquid resinous composition. After the resinous composition is solidified, polymerization can be further carried out at a higher temperature (e.g. 100° C. or higher).

The present invention is explained more in detail by way of the following examples, wherein amounts are based on weight unless otherwise specified. The term "MMA" means methyl methacrylate and the term "MMA syrup" means a solution comprising 100 parts of MMA prepoymer and about 40 parts of MMA monomer.

EXAMPLE 1

Filler-loaded pulp paper consisting essentially of pulp and aluminum hydroxide (20:80 in weight ratio) was soaked in a liquid resinous composition comprising 97 parts of the MMA syrup having a viscosity of about 55 cps, 3 parts of a cross-linking agent (glycerol dimethacrylate), and 0.1 part of an azobis polymerization catalyst (2,2'-azobisisobutyronitrile) for 5 minutes. Thereafter, excess liquid resinous composition was removed from the surface of the paper. Then the resulting paper was sandwiched with defoaming treatment between two molding glass plates, clamped as tightly as possible and placed horizontally, and was subjected to polymerization reaction in an oven at 45° C. for 2 hours and thereafter at 110° C. for 1 hour. As schematically shown in FIG. 1, there was obtained a marble-translucent thin decorative sheet having suitable resilient properties and some light-transmission properties. The sheet was about 0.25 mm in thickness and the surface texture thereof was like a resin sheet. The decorative sheet was water-resistant and had some soft feeling due to the softness of the pulp paper.

EXAMPLE 2

Figure 2:
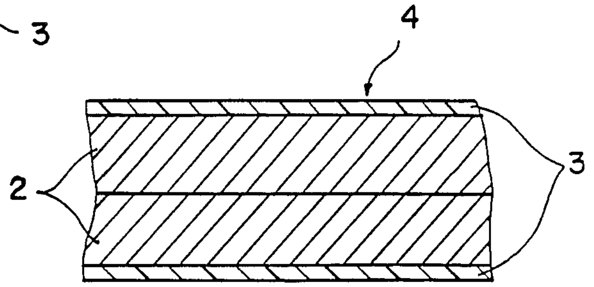
FIG. 2 is a schematic cross-sectional partial view of another embodiment of the thin decorative sheet 4 according to the present invention, wherein two sheets of pulp paper 2 are laminated.

The filler-loaded pulp paper as used in Example 1 was impregnated with a liquid resin composition comprising 48.5 parts of the MMA syrup having a viscosity of about 55 cps, 1.5 parts of a crosslinking agent (glycerol dimethacrylate), 50 parts of aluminum hydroxide (average particle size: 10 microns), and 0.1 part of an azobis polymerization catalyst (azobisisobutyronitrile). Two sheets of the resulting paper were laminated and sandwiched between two molding glass plates, and then subjected to polymerization reaction as in Example 1. There was obtained a marble-translucent thin resilient sheet having a cross-section as shown in FIG. 2. The decorative sheet exhibited high-quality textures, and had suitable light-transmission property although lower than that of the sheet in Example 1.

The decorative sheet was about 0.5 mm in thickness and exhibited deep marble-translucent tones. In spite of containing inorganic filler powder, the decorative sheet was more resilient than ordinary acrylic sheets, and could be wound around a cylinder of 10 cm in diameter without cracks.

The decorative sheet was cut into a strip of 1 cm in width and an edge of the strip was exposed to the flame of a cigarette lighter with an angle of 45° for 10 seconds. The strip burned in the flame, but the fire was extinguished in about 20 seconds after the strip was separated away from the flame, to show self-extinguishing properties of the decorative sheet. The same test was carried out for a similar strip wherein the surface resin layer was removed by means of sand paper. The fire was extinguished in about 5 seconds after the strip was separated away from the flame to show higher flame retardance.

EXAMPLE 3

The filler-loaded pulp paper as used in Example 1 was impregnated by means of masking partly with (a) a liquid resinous composition comprising 97 parts of the MMA syrup having a viscosity of about 55 cps, 3 parts of a crosslinking agent (glycerol dimethacrylate) and 0.1 part of an azobis polymerization catalyst (2,2'-azobisisobutyronitrile), and partly with (b) a liquid resinous composition comprising 65 parts of the MMA syrup, 2 parts of the crosslinking agent, 33 parts of fine silica stone powder (average particle diameter: 12 microns) and 0.07 part of the azobis polymerization catalyst, alternately to form a striped pattern of impregnation. Other filler-loaded pulp paper as used in Example 1 was partly impregnated with the liquid resinous composition (b) to form spots 6 on the paper and the remaining part 5 of the paper not impregnated therewith was impregnated with the liquid resinous composition (a) to form a dotted pattern of impregnation. Each of the pulp paper impregnated therewith was sandwiched between two glass plates as in Example 1, and then subjected to a polymerization reaction at 45° C. for 2 hours and at 110° C. for 1 hour.

Figure 3A:
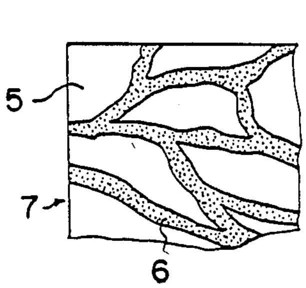
FIG. 3 (*a*) and FIG. 3 (*b*) are schematic plane views of the thin decorative sheets 7 provided with patterns 6 by the use of two or more resin compositions according to the present invention.
Figure 3B:
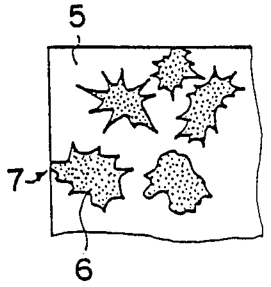
Figure 4:
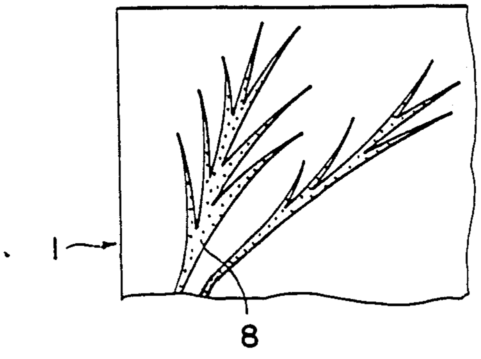
FIG. 4 is a plane view showing the thin decorative sheet having a printed pattern 8 thereon.

As a result, there were obtained marble-translucent sheets having a striped pattern (5, 6) as shown in FIG. 3 (*a*) and a dotted pattern 6 as shown in FIG. 3 (*b*), respectively. These patterns are exhibited due to some difference in colors of the resin compositions thus impregnated and cured. The patterns markedly come out in a relief fashion because of a large difference in light-transmission properties between the cured resin compositions, when an incident light was applied from the back side of such decorative sheets.

EXAMPLE 4

The filler-loaded pulp paper as used in Example 1 was printed with an ink resistant to the resinous composition and then subjected to the processes in Examples 1 and 2, respectively, to obtain thin decorative sheets. As a result, there were obtained a clear printed decorative sheet by using the resinous composition containing no inorganic filler according to the process of Example 1, and a foggy printed decorative sheet by using the resinous composition containing an inorganic filler powder according to the process of Example 2.

EXAMPLE 5

Filter pulp paper was soaked in a liquid resinous composition comprising 48.5 parts of the MMA syrup having a viscosity of 55 cps, 1.5 parts of a crosslinking agent (glycerol dimethacrylate), 50 parts of aluminum hydroxide, and 0.05 part of an azobis polymerization catalyst (2,2'-azobisisobutyronitrile) for 10 minutes, sandwiched between two molding glass plates, clamped, and subjected to a polymerization reaction as in Example 1. As a result, there was obtained a decorative thin sheet having the appearance, textures, and properties very similar to those obtained in Example 1.

Incidentally, the molding plates for molding the present thin decorative sheet can be glass or metal plates or a mold comprising plural mold portions. The thin decorative sheet can have flat or curved surfaces. Such a curved decorative sheet can be produced by using the plates or mold having curved molding surfaces, as necessary under pressure.

The main features of the present invention are summarized below. (1) The decorative sheet has high flame retardance, and harmful gases are not substantially generated if it should be burned. ② The sheet has long-term stability and good durability. ③ The sheet has suitable light-transmission properties, deep marble-translucent tones, and high-quality textures. ④ The sheet can be readily processed and installed because it is resilient, not fragile, thin, light in weight and shapable. When the cured resin of the sheet is a thermoplastic resin, it can be applied onto curved surfaces and corners, by warming it as necessary. ⑤ The sheet having a desired design pattern or thickness can be produced according to the process for production of the present invention.

In addition, the term "substantially transparent cured resin" or "resinous composition for substantially transparent cured resin" herein means that the cured resin itself is substantially transparent and the cured resin containing the whitish filler powder naturally looks translucent.

What is claimed is:

1. A marble-translucent resilient decorative sheet, said resilient decorate sheet having a thickness in the range of about 0.1 mm to 5 mm and comprising a layer of permeable pulp paper, a substantially transparent cured resin impregnated throughout the pulp paper, and a fine, substantially white inorganic filler powder uniformly deposited onto at least one surface of the pulp paper and being firmly fixed thereto, whereby the decorative sheet is provided with a deep marble-translucent tone by the synergistic effect of both the filler powder and the pulp paper impregnated with the cured resin.

2. The decorative sheet according to claim 1, in which the filler powder is impregnated throughout the pulp paper.

3. The decorative sheet according to claim 1, in which the filler powder penetrates into the pulp paper layer and is deposited therein.

4. The decorative sheet according to claim 1, including a surface layer of said resin on said layer of pulp paper.

5. The decorative sheet according to claim 4, in which the resin surface layer contains fine whitish inorganic filler powder.

6. The decorative sheet according to claim 4, in which the resin surface layer has an embossed or frosted pattern thereon.

7. The decorative sheet according to claim 1, which has a pattern provided by alternate impregnation with at least two different resin compositions.

8. The decorative sheet according to claim 1, which has a printed pattern on the pulp paper.

9. The decorative sheet according to claim 1, further comprising a plurality of laminated layers of the resin impregnated pulp paper.

10. The decorative sheet according to claim 1, in which the permeable pulp paper is filler-loaded pulp paper containing the fine whitish inorganic filler powder throughout the pulp paper.

11. The decorative sheet according to claim 1, in which the cured resin is a substantially thermoplastic resin.

12. The decorative sheet according to claim 11, in which the resin comprises an acrylic resin.

13. The decorative sheet according to claim 12, in which the inorganic filler comprises aluminum hydroxide powder.

14. The decorative sheet according to claim 4, in which said surface layer of resin has a thickness is in the range of about 0.01 mm to about 0.1 mm.

* * * * *